(No Model.)

J. M. BURNETT.
MILK AND CREAM GAGE.

No. 273,947. Patented Mar. 13, 1883.

Witnesses:
A. M. Long.
H. J. Osgood.

Inventor.
John M. Burnett.
by Howard A. Snow.
his Atty.

UNITED STATES PATENT OFFICE.

JOHN M. BURNETT, OF INDEPENDENCE, ASSIGNOR TO J. W. CONCHER, OF DUBUQUE, IOWA.

MILK AND CREAM GAGE.

SPECIFICATION forming part of Letters Patent No. 273,947, dated March 13, 1883.

Application filed November 21, 1882. (No model.)

*To all whom it may concern:*

Be it known that I, JOHN M. BURNETT, a citizen of the United States, residing at Independence, in the county of Buchanan and State of Iowa, have invented certain new and useful Improvements in Milk and Cream Gages, of which the following is a specification, reference being had therein to the accompanying drawings.

This invention has relation to improvements in milk and cream gages; and it consists in the construction and arrangement of its several parts, as will be hereinafter fully described, and specifically pointed out in the claim.

Figure 1:
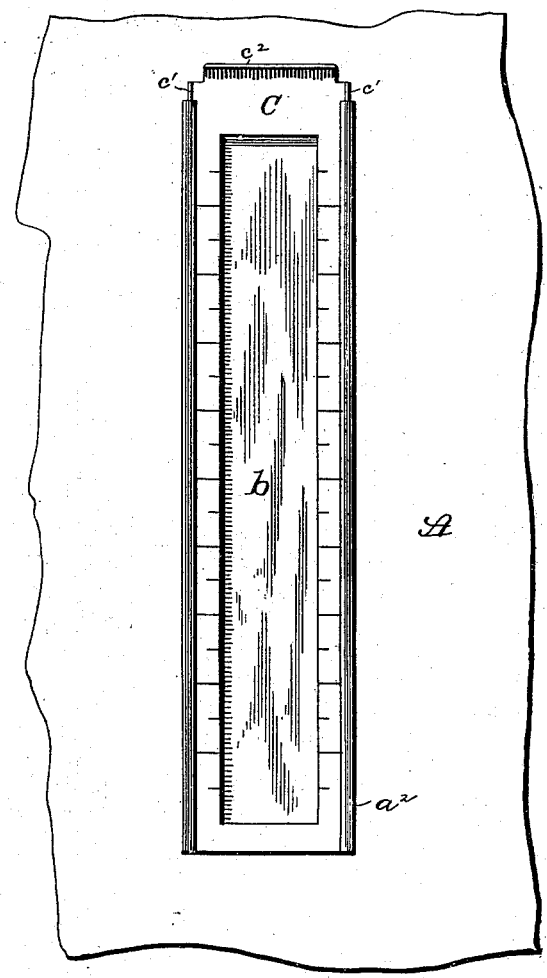
Figure 2:
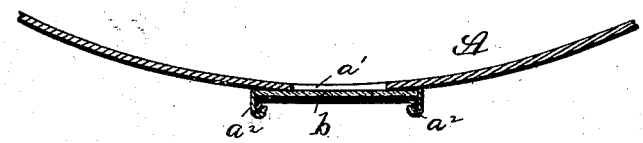

In the drawings, Figure 1 is a side view of a section of a can having my gage attached, and Fig. 2 is a sectional view of the same.

The principal object and aim of my invention is to arrange the glass and gage close to the milk and cream, so that the sight will be direct, and also to make the gage and glass so they may be easily removed and replaced, as may be desired, and will be more fully described.

$a$ is the can, or a section thereof, and it may be made any size or shape desired.

$a'$ is an elongated opening cut in the side of the can.

$a^2$ are guides arranged on either side of the opening $a'$, having one of their edges soldered to the can and their opposite edges bent over to form ways for the flanged edges of the gage, hereinafter described.

$b$ is the glass placed down against the can, over and covering the opening $a'$. It may be secured to the can, where so desired, by any suitable cement.

$c$ is the gage, the center of which is cut away to uncover the glass, and its outer edges are turned up to form flanges $c'$, which fit in the guides $a^2$. The strips left at either side of the opening in the gage are graduated in any desired scale. The end $c^2$ of the gage is bent to form a handle, whereby it may be placed in or removed from its position.

By this construction I am enabled to bring the glass so that the milk and cream will rest against it on one side and the gage directly against it on the other side, so that the view of the contents of the can is direct instead of oblique, as in devices of ordinary construction. My glass and gage, when desired, may be easily removed for the purpose of cleaning or otherwise.

What I claim is—

The combination of the milk-can provided with opening $a'$, the guides $a^2$, projected upward on either side of the opening $a'$, and having their upper edges turned to provide ways for the gage, the glass $b$, placed down over the opening $a'$ and close to the contents of the can, and the gage $c$, constructed with the central opening through which the glass is viewed, and provided on its edges with suitable graduations, and moved in guides $a^2$ into place over the glass, substantially as set forth.

In testimony whereof I affix my signature in presence of two witnesses.

JOHN M. BURNETT.

Witnesses:
H. W. HOLMAN,
JAY BORIGHT.